(12) United States Patent
Poo et al.

(10) Patent No.: US 9,064,135 B1
(45) Date of Patent: Jun. 23, 2015

(54) HARDWARE IMPLEMENTED KEY MANAGEMENT SYSTEM AND METHOD

(75) Inventors: Tze Lei Poo, Sunnyvale, CA (US); David Geddes, Fremont, CA (US)

(73) Assignee: Marvell International Ltd. (BM)

( * ) Notice: Subject to any disclaimer, the term of this patent is extended or adjusted under 35 U.S.C. 154(b) by 1197 days.

(21) Appl. No.: 11/955,223

(22) Filed: Dec. 12, 2007

Related U.S. Application Data

(60) Provisional application No. 60/869,645, filed on Dec. 12, 2006, provisional application No. 60/893,478, filed on Mar. 7, 2007, provisional application No. 60/914,453, filed on Apr. 27, 2007.

(51) Int. Cl.
*H04L 9/14* (2006.01)
*H04L 9/28* (2006.01)
*G06F 21/72* (2013.01)

(52) U.S. Cl.
CPC ..................... *G06F 21/72* (2013.01)

(58) Field of Classification Search
None
See application file for complete search history.

(56) References Cited

U.S. PATENT DOCUMENTS

| | | | | |
|---|---|---|---|---|
| 5,384,847 A * | 1/1995 | Hendrickson et al. | ........ | 380/247 |
| 6,226,618 B1 * | 5/2001 | Downs et al. | .................. | 705/51 |
| 6,961,858 B2 * | 11/2005 | Fransdonk | ....................... | 726/29 |
| 7,203,312 B1 * | 4/2007 | Hatanaka et al. | ............. | 380/201 |
| 7,739,501 B2 * | 6/2010 | Kimmel et al. | ............... | 713/168 |
| 7,979,717 B2 * | 7/2011 | Ding | ............................. | 713/185 |
| 2002/0095382 A1 * | 7/2002 | Taoka et al. | ..................... | 705/50 |
| 2005/0172132 A1 * | 8/2005 | Chen et al. | .................... | 713/180 |
| 2005/0177741 A1 * | 8/2005 | Chen et al. | .................... | 713/189 |
| 2006/0242407 A1 * | 10/2006 | Kimmel et al. | ................ | 713/166 |
| 2008/0063209 A1 * | 3/2008 | Jaquette et al. | ............... | 380/284 |
| 2010/0008499 A1 * | 1/2010 | Lee et al. | ........................ | 380/46 |

OTHER PUBLICATIONS

"AES Key Wrap Specification", Nov. 16, 2001; pp. 1-23.

* cited by examiner

*Primary Examiner* — Christopher Revak

(57) ABSTRACT

A hardware implemented system and method of encryption key management may facilitate access to a connected device. In some embodiments, an Input/Output (I/O) controller coupled to a host system may comprise a cryptocontext memory that is only accessible via state machines running on the controller and a key unwrap engine to decrypt wrapped keys associated with commands received from the host system.

33 Claims, 4 Drawing Sheets

HARDWARE IMPLEMENTED KEY MANAGEMENT SYSTEM AND METHOD

CROSS-REFERENCE TO RELATED APPLICATIONS

The present application claims the benefit of the following U.S. provisional application Ser. No. 60/869,645, filed Dec. 12, 2006, entitled "Key Management for SAS/SATA"; Ser. No. 60/893,478, filed Mar. 7, 2007, entitled "XTS High Speed Hardware Architecture for SAS/SATA"; and Ser. No. 60/914,453, filed Apr. 26, 2007, entitled "AES_XTS High Speed Hardware Architecture". The disclosures of these applications are incorporated herein by reference in their entireties.

BACKGROUND

1. Field of the Invention

Aspects of the present invention relate generally to data encryption and decryption techniques, and more particularly to a hardware implemented system and method of encryption key management.

2. Description of Related Art

In many computer systems and network implementations, data security can be a factor that influences both architecture and software design. The motivation (e.g., on the part of users or system administrators) to prevent unauthorized access to confidential, proprietary, or otherwise sensitive data has inspired development of various data encryption techniques and has prompted advances in both hardware and software to implement those techniques.

Most encryption/decryption strategies employ cipher algorithms in conjunction with predetermined variable values (i.e., "keys") to encrypt data; a unique data string processed by the algorithm initialized with the key should result in a unique encrypted (or "wrapped") version of that data string. Reversing the process, i.e., applying an inverse algorithm with the same key on the encrypted data, should reproduce the original unique data string. Mere a cipher algorithm is sophisticated enough, and the length of the keys (in terms of bits per key, for instance) employed by the system is sufficiently long, such techniques can practically encrypt vast amounts of data with an extremely high likelihood that the data cannot be unencrypted without prior knowledge of the original encryption key. Conventional methodologies tend to focus on encrypting data, per se, or to restricting access to unencrypted data at the application level. At the hardware level, typical implementations do not integrate encryption/decryption functionality into a device controller such that unauthorized access to data (encrypted or unencrypted) resident on a device connected to the controller may be prevented. Further, conventional encryption techniques, both hardware- and software-based, employ strategies that ultimately render the keys themselves vulnerable to interception or other unauthorized access (e.g., via malicious software or "hacking" efforts).

Therefore, it may be desirable in some instances to provide a system and method that are capable of managing encryption keys in a hardware configuration that prevents unauthorized access to the keys.

SUMMARY

Embodiments of the present invention overcome the above-mentioned and various other shortcomings of conventional technology, providing a hardware implemented system and method of encryption key management. In some embodiments, an Input/Output (I/O) controller coupled to a host system may comprise a cryptocontext memory that is only accessible via state machines running on the host bus adapter and a key unwrap engine to decrypt wrapped keys associated with commands received from the host system.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

Though encryption key management is described below in the context of an integrated circuit (IC), or "chip," employing both an embedded central processing unit (CPU) and an Input/Output (I/O) controller (or host bus adapter (HBA)), it will be appreciated that the present disclosure and claimed subject matter are not intended to be limited in this regard. In some embodiments, for instance, a system and method of key management may be implemented in a suitably configured "stand-alone" or peripheral HBA, i.e., an HBA that is not incorporated into a monolithic chip or single IC device. Numerous computer architectures and hardware component arrangements employ one or more integrated or peripheral controllers or HBAs to facilitate data transfer between a processing component or system memory and a device; the hardware implemented system and method of key management described herein may be employed in connection with any such system architecture utilizing an HBA.

In that regard, an HBA, sometimes referred to as a "controller," a "host adapter," an "Input/Output (I/O) processor," an "Input/Output Controller" (IOC), or a "ROC" (redundant array of independent disks (RAID) on chip) device, may generally be employed to connect or operably couple a device to a computer or its processing components and attendant system memory. Examples of devices that may be connected to a computer system via an HBA include, but are not limited to, the following: a hard disk drive unit; a compact disk (CD), digital versatile disk (DVD), or other optical or opto-electrical drive unit; magnetic tape drives; multi-unit arrays of the foregoing or combinations thereof; and other components and devices generally operable in conjunction with data storage media to store digital data. In a personal computer system or server environment, an HBA may generally be embodied in or comprise an adapter card or printed circuit board that plugs into a system bus; as noted above, however, an HBA may alternatively be integrated with a processor, system memory, communications hardware, and other components in a monolithic chip or application specific integrated circuit (ASIC). It will be appreciated that the generic term "I/O controller" encompasses both of these implementations.

Implementation

Figure 1:
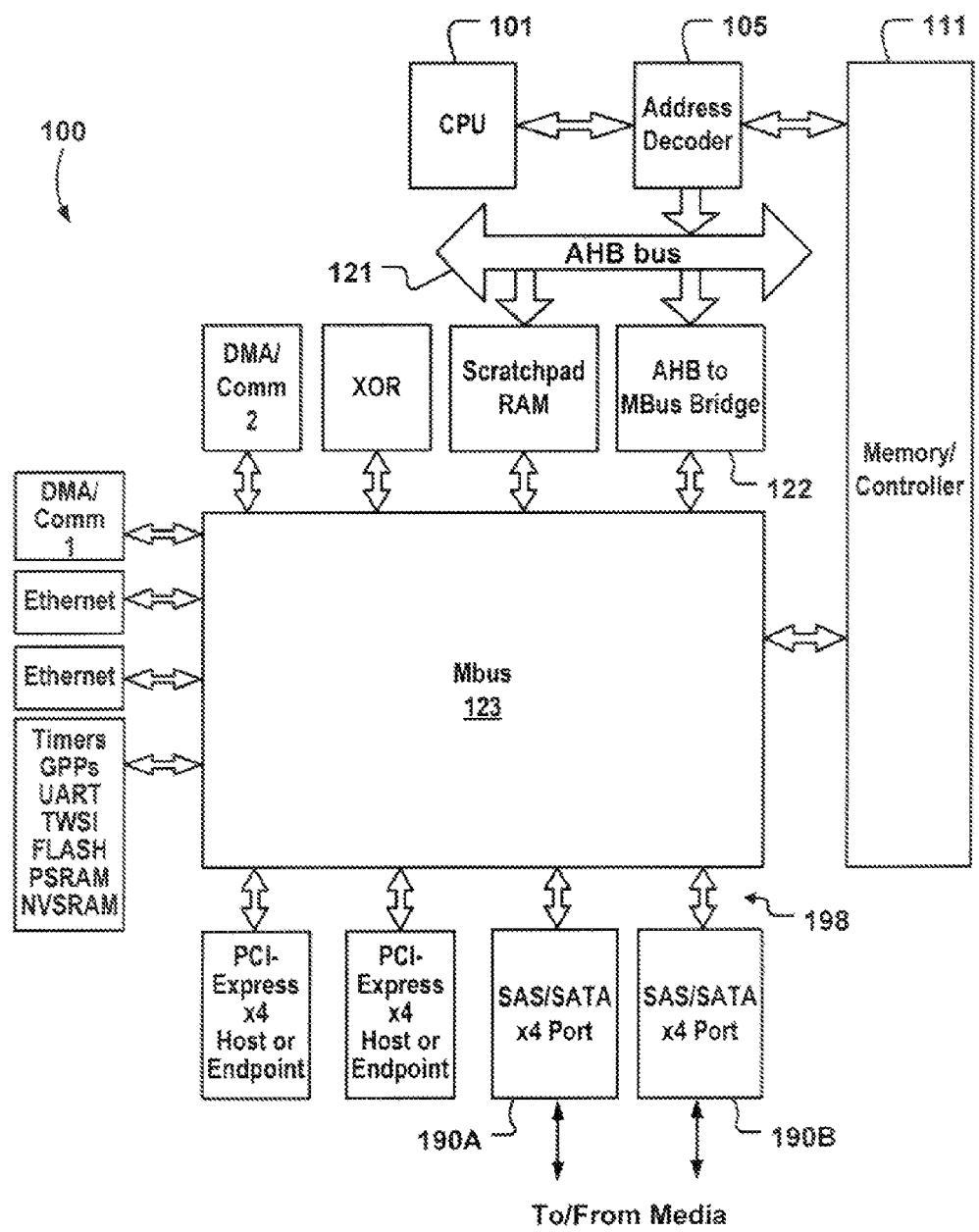
FIG. 1 is a simplified block diagram illustrating components of one embodiment of an integrated circuit including an embedded processor and I/O controllers.
Figure 2:
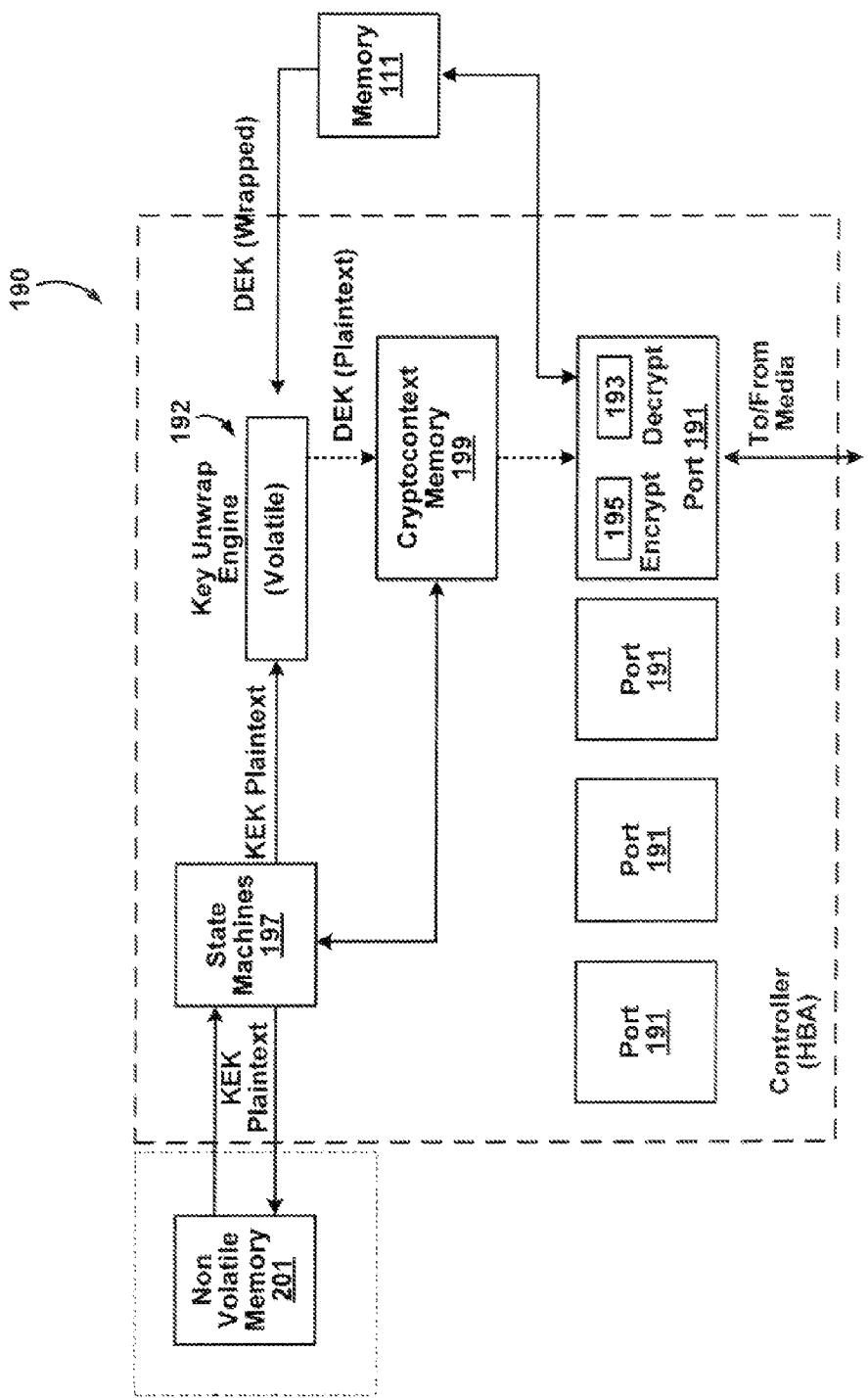
FIG. 2 is a simplified block diagram illustrating components of one embodiment of an I/O controller capable of encryption key management.

Turning now to the drawing figures, FIG. 1 is a simplified block diagram illustrating components of one embodiment of an integrated circuit including an embedded processor and I/O controllers, and FIG. 2 is a simplified block diagram illustrating components of one embodiment of an I/O controller capable of encryption key management.

In the illustrated embodiment, host system 100 generally comprises an embedded processing component, such as CPU 101, having access to system, or "host," memory 111. An address decoder 105 may facilitate write and read operations, both with respect to memory 111 and with respect to a communication bus 121; in the FIG. 1 embodiment, bus 121 is depicted as an advanced high-performance bus (AHB), though other technologies may be suitable for some applications.

In operation of system 100, a bridge 122 may enable communication of data between bus 121 and a host or maintenance bus (Mbus) 123. Mbus 123 may generally allow other system components to access CPU 101 and memory 111 as illustrated in FIG. 1.

CPU 101 may be embodied in or comprise any of various types of microprocessors (e.g., single- or multi-core microprocessors) or microcontrollers, and may generally incorporate or have access to cache memory, memory management units, and other components to facilitate processing functionality. In a monolithic IC embodiment, CPU 101 may be designed and constructed to support the intended functionality and operational characteristics of system 100; in a conventional computer system embodiment, CPU 101 may be selectively removable such that processing capabilities of system 100 may be modified as desired or necessary for particular applications.

Similarly, memory 111 may be embodied in or comprise any of various data storage technologies or a combination thereof. In that regard, memory 111 may generally include or be coupled to an appropriate memory controller to facilitate read and write operations; the operational characteristics of such a controller may be selected in accordance with the type and nature of the data storage technology implemented by memory 111. For instance, memory 111 may comprise a 64 bit wide random access memory (RAM) component; additionally or alternatively, memory 111 may comprise a 32 bit, 40 bit, 72 bit, 128 bit, 144 bit, or 256 bit wide RAM component. It will be appreciated that memory 111 may be implemented as dynamic RAM (DRAM), synchronous DRAM (SDRAM), or double data rate (DDR) SDRAM, though other types may be appropriate for some applications. In some embodiments, memory 111 may be implemented in conjunction with error correction code (ECC) techniques. As described above with reference to CPU 101, memory 111 may be designed and constructed to support or otherwise to satisfy the data storage requirements of a monolithic IC; in some alternative embodiments, memory 111 may be removable such that the data storage capacity of system 100 may be selectively modified. Additional or alternative system memory may be provided by a device or component coupled to one or more peripheral component interface (PCI) controllers described below.

As illustrated in FIG. 1, system 100 may generally include various other components coupled to Mbus 123. Examples of such components include, but are not limited to, scratchpad RAM and various data communication ports such as an exclusive OR (XOR) port providing parity, direct memory access (DMA) ports, Ethernet (such as 10 base-T, 100 base-T, or gigabit) ports, or ports operative in accordance with other communications protocols, or a combination thereof. In addition, system 100 may include timers, a general purpose port (GPP) for interrupt control, a universal asynchronous receiver/transmitter (UART), a two-wire serial interface (DNSI), flash memory, pseudo-static RAM (PSRAM), and non-volatile SRAM (NVSRAM).

The architecture of system 100 depicted in FIG. 1 is provided by way of example only. The present disclosure and claimed subject matter are not intended to be limited by the structure, design, functionality, and arrangement of the components described above. Those of skill in the art will appreciate that system 100 is susceptible of various modifications, including both incorporation of additional elements or devices as well as omission of several of the illustrated components.

As illustrated at the bottom of FIG. 1, system 100 may include I/O controllers. Two PCI controllers are illustrated, though any number may be employed depending, for example, upon the number of PCI compatible peripheral devices intended to be coupled to system 100. PCI controllers may be connected to a host computer system, solid state memory (e.g., which may supplement or replace memory 111), video adapters, a Fibre Channel controller, an external serial-attached SCSI (small computer system interface) (SAS)/serial advanced technology attachment (SATA) controller, or any PCI compatible device. Additionally, system 100 may include two SAS/SATA controllers (reference numerals 190A and 190B); it will be appreciated that system 100 may comprise a single such SAS/SATA controller, or more than two. While the following description is directed primarily to SAS/SATA controllers 190A and 190B for clarity, it will be appreciated that a system and method of key management as set forth herein may be employed in conjunction with any type of I/O controller, including, but not limited to, PCI controllers and SCSI controllers.

In some embodiments, SAS/SATA controllers 190A and 190B may be employed as hard disk drive or tape drive interfaces; alternatively, depending upon requirements of system 100, controllers 190A and 190B may be employed to control or otherwise to facilitate access to any SAS/SATA compatible device. Accordingly, FIG. 1 illustrates controllers 190A and 190B as capable of bi-directional data communications with generic "media," which may include hard disk storage, other device-based memory (such as data maintained on compact disk (CD) or digital versatile disk (DVD), for example), solid state memory, or any other data communicated to ports at controllers 190A and 190B.

FIG. 2 illustrates components of one embodiment of a controller 190 that is representative of controllers 190A and 190B. As noted above, controller 190 may be operative in accordance with any of various standards (such as SAS/SATA, PCI, and SCSI) that are common in the computer and electronic device industries; a system and method of key management as set forth herein may also have utility in future standards that are developed for use with advanced I/O controllers and peripheral equipment.

In operation, controller 190 may facilitate communication between Mbus 123 and a device (not shown in the drawing figures) that is compatible with the standard employed by controller 190, enabling the device to access processing and memory resources of system 100; similarly, system 100 and its several components may access data and other resources resident on the connected device. As set forth in detail below, access requests or other commands (initiated by components of system 100 and generally communicated via control frames or other known mechanisms) related to interaction with a device connected to controller 190 may be associated with encrypted (or "wrapped") keys; in operation, these keys are decrypted (or "unwrapped") and employed to initialize encryption and decryption algorithms that operate, respectively, to encrypt and decrypt data written to and read from the device. The embodiment of controller 190 illustrated in FIG. 2 may manage keys to prevent unwrapped keys (i.e., in plaintext form) from being intercepted or otherwise accessed without authorization.

Controller 190 may be coupled to Mbus 123 via a bus 198 (see FIG. 1) that is suitably configured to enable bi-directional data communication at an appropriate, necessary, or desired data rate. In some embodiments, controller 190 may include four ports (reference numeral 191) which may be utilized (either independently or in cooperation) to connect one or more devices to system 100; in such embodiments, bus 198 may be embodied in or comprise a four lane (i.e., one lane per port) PCI express bus, though other connections may be appropriate in some instances.

Controller 190 may implement key management functionality, enabling hardware-based data encryption and decryption techniques while preventing access to unwrapped keys employed by several hardware processing engines. In that regard, controller 190 may utilize both Key Encryption Keys (KEKs) and Data Encryption Keys (DEKs) as set forth in detail below. As is generally known, a KEK may be employed to wrap and unwrap other keys (typically DEKs), while a DEK may be employed to encrypt and decrypt data passing through controller 190.

As illustrated in FIG. 2, controller 190 may generally comprise a cryptocontext memory 199, one or more state machines (indicated generally at reference numeral 197), a key unwrap engine 192, a data encryption engine 195, and a data decryption engine 193. In addition, controller 190 may also comprise one or more data processing components (not shown) such as a microprocessor, microcontroller, or other data processing engine either to control or to facilitate operation of controller 190 itself or encryption engine 195, decryption engine 193, key unwrap engine 192, state machines 197, or some combination thereof.

In some embodiments, controller 190, encryption engine 195, and decryption engine 193 may operate in accordance with the advanced encryption standard (AES) and various of its compatible operating modes. For example, controller 190 may be designed to be compatible with an AES cipher engine operating in Xor-Encrypt-Xor (XEX) mode (AES-XEX). Alternatively, controller 190 may be compatible with an AES cipher engine operating in the XEX-based tweaked codebook (TCB) mode with ciphertext stealing (CTS); this encryption mode is generally referred to as AES-XTS, and is set forth in the Institute of Electrical and Electronics Engineers (IEEE) P1619 standard, the disclosure of which is incorporated herein by reference in its entirety. The National Institute of Standards and Technology (NIST) has similarly promulgated several encryption standards; controller 190 may be operative in accordance with these NIST standards as well.

As is generally known, the foregoing and other encryption technologies operate using keys which must be managed both to control access to sensitive data as well as to prevent unauthorized users from stealing or otherwise gaining access to the keys themselves. It will be appreciated that the key management techniques set forth herein are not limited to any particular encryption standard or method, and that the disclosed embodiments may have utility in connection with any key-based encryption technology. In particular, the key wrapping and unwrapping functionality set forth below may be executed in accordance with the AES Key Wrap Specification, though other standards may also be appropriate in certain circumstances.

It is noted that the keys may initially be received from a source external to controller 190 (e.g., from memory 111 of system 100) in an unencrypted (or "unwrapped"), plaintext state. Prior to encryption, such plaintext keys may reside in unprotected memory, and thus may be vulnerable to interception. In some embodiments, it may be possible to minimize or to eliminate this vulnerability by implementing a hardware asymmetric key cryptosystem that feeds plaintext keys directly into encryption engine 195, for example, using a public/private key hardware support mechanism that would prevent unwrapped keys from existing in memory 111; while increasing key security by limiting the existence of unwrapped keys in unprotected memory, this architecture may add to the complexity and cost of controller 190, system 100, or both. As an alternative, plaintext keys may be wrapped within controller 190 itself, e.g., via a key wrap engine (not shown) executing an algorithm that performs a function inverse to that performed by key unwrap engine 192. In some embodiments, such a key wrap engine need not be integrated with controller 190. For example, keys may be wrapped by any of various components of host system 100 for storage in memory 111. In such embodiments where keys are already in encrypted form as provided by system 100 or a source external to system 100, dedicated hardware within controller 190 may not be required with respect to wrapping the keys themselves for secure storage in memory 111.

In operation, key unwrap engine 192 may employ a "master key," or KEK, for unwrapping DEKs from ciphertext form to plaintext for use by encryption engine 195 and decryption engine 193. Though illustrated in FIG. 2 as servicing a single port 191, it will be appreciated that encryption engine 195 and decryption engine 193 may be shared among the various ports 191 of controller 190 such that a single encryption engine and a single decryption engine may be employed to process data associated with commands or requests directed to devices at different ports. As noted above, encryption engine 195 and decryption engine 193 may be configured to operate in accordance with any of various encryption methodologies including, but not limited to, AES-XEX and AES-XTS. Encryption engine 195 and decryption engine 193 may generally be implemented in hardware, and accordingly, the particular architecture of each may be influenced by the encryption standard intended to be used in conjunction with system 100.

Wrapped keys may be stored in an unprotected memory device such as memory 111, for example. Once the keys are wrapped (e.g., by hardware at controller 190 or by an external source providing keys to system 100, controller 190, or both) and stored in memory 111, it may be desirable to delete any unwrapped copies that may be resident in memory 111 or otherwise accessible by components of system 100. In accordance with the disclosed system and method of key management, whenever keys are in a memory (such as memory 111) that can be read by any component of system 100 other than state machines 197 (described below), the keys are wrapped. This strategy minimizes or eliminates the risk that unwrapped keys may be intercepted or put to unauthorized use.

Wrapped keys must be decrypted by key unwrap engine 192 integrated with controller 190 prior to use. As noted above, a KEK may be stored in, or accessed by, key unwrap engine 192 for this purpose. In some embodiments, key unwrap engine 192 may store two or more KEKs, e.g., in volatile memory or cache, for use in unwrapping DEKs. As illustrated in FIG. 2, a number of KEKs may be stored off-chip (i.e., external to controller 190) in non-volatile memory 201; additionally or alternatively, it may be desirable to store some KEKs on-chip, e.g., in a dedicated non-volatile memory device integrated with controller 190, in some circumstances. In some embodiments, memory 201 may be of sufficient capacity to store as many as 512 KEKs, though memory 201 may be sized to store any number of KEKs sufficient to support operations of controller 190.

When needed, a KEK in plaintext form may be read from memory 201 by state machines 197 and loaded into key unwrap engine 192. In that regard, when controller 190 requires a DEK (e.g., associated with a particular command), the appropriate wrapped DEK is loaded into key unwrap engine 192 from memory 111, and the DEK is then unwrapped at engine 192.

The unwrapped DEK may be stored in cryptocontext memory 199 by state machines indicated at functional block 197. In some embodiments, cryptocontext memory 199 may only be written via state machines 197, and may not be read by any state machine other than state machines 197 running in controller 190 itself. In some instances, a single four port SAS/SATA controller may have up to 512 active commands; accordingly, cryptocontext memory 199 may be sized to accommodate 512 unencrypted keys to support operations of controller 190. Other implementations may require different capacities for cryptocontext memory 199. In some embodiments, it may be desirable to prevent unauthorized access to KEKs (which are generally stored in unencrypted, plaintext form), and so cryptocontext memory 199 may be utilized to store a desired number of KEKs and may be sized accordingly.

In the foregoing manner, cryptocontext memory 199 may be protected to the extent that state machines 197 integrated with controller 190 are the only components of system 100 that are allowed read and write access. Further, it may be desirable to restrict state machines 197 such that unencrypted keys may not be written to any location other than cryptocontext memory 199; alternatively, for flexibility and customization of system 100, it may be desirable to allow state machines 197 to write plaintext KEKs to memory 201 as illustrated in FIG. 2. State machines 197 may be implemented in hardware, for example, and serve to isolate cryptocontext memory 199 from other elements of system 100 by selectively preventing or otherwise controlling access to cryptocontext memory 199 in accordance with predetermined rules governing read and write operations.

Following the initial wrapping (and the subsequent deletion of unwrapped copies, if applicable), DEKs in plaintext form do not reside anywhere in system 100 other than in cryptocontext memory 199. State machines 197 controlling access to cryptocontext memory 199 may ensure that such DEKs in plaintext form may not be accessible by CPU 101, UART, PCI controller interfaces, scan chains, Built-In Self Test (BIST) logic, or any other component illustrated in FIG. 1 or other system components that are not illustrated.

Figure 3:
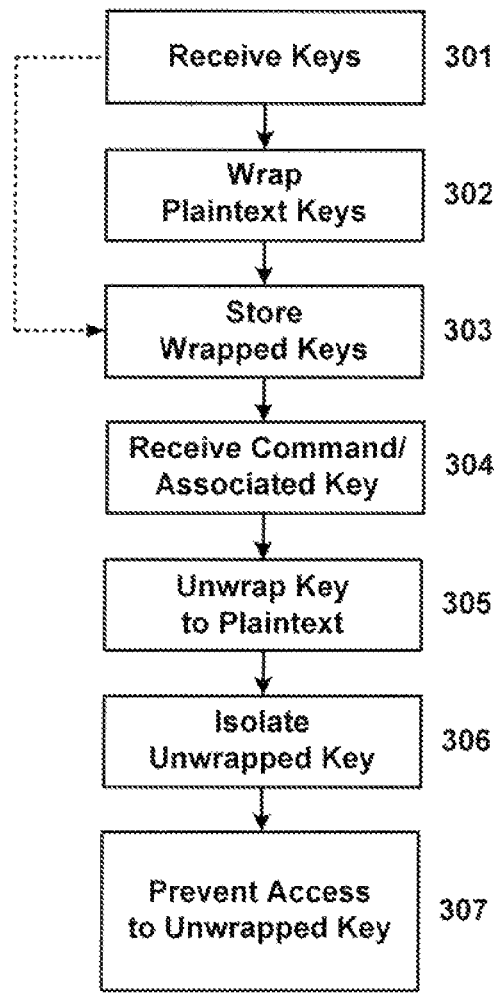
FIG. 3 is a simplified flow diagram illustrating the general operation of one embodiment of a key management method implemented by an I/O controller.

FIG. 3 is a simplified flow diagram illustrating the general operation of one embodiment of a key management method implemented by an I/O controller. The following functionality may be provided by embodiments of controller 190 described above. As indicated at block 301, keys may be received, e.g., from a host such as components of system 100 or from a source external to system 100. As noted above, the keys may be received in plaintext form, in which case the method proceeds to block 302. Mere keys are already wrapped when received by the controller, then the method may proceed to block 303 as indicated by the dashed arrow at the left side of FIG. 3.

As indicated at block 302, unwrapped keys may be wrapped, e.g., via a key wrap engine employing a KEK and any of various encryption schemes substantially as set forth above. In some implementations, the wrapping operation at block 302 may include utilizing a mechanism to generate random numbers for key wrapping purposes. For example, if the host requests that controller encryption hardware provide assistance with respect to generating (in addition to wrapping) unencrypted keys stored in unprotected memory, or if the KEK itself requires generation, a random number generator may be employed. It will be appreciated that approximately 264 clock cycles or more may be required to wrap a 256 bit key; additional clock cycles (approximately 528) are required to wrap a 512 bit key, or if random number generation is employed. The procedure at block 302 may only be executed once during the useful life of a particular key, however, so processor loads associated with key wrapping functionality generally may not adversely affect overall system performance.

Wrapped keys may be stored in host system memory (block 303) as set forth above. Since the keys are encrypted, the operation depicted at block 303 may write wrapped keys to unprotected memory. Each plaintext AES-XEX key is 4 blocks of 64 bits (i.e., 256 bits); when wrapped, such a key expands to 4+1 blocks of 64 bits (i.e., 320 bits). Similarly, an AES-XTS key may be 256 bits, which expands to 320 bits when the key is wrapped. Some AES-XTS keys may be 512 bits in plaintext form and expand to 576 bits when wrapped. In some embodiments, a system including I/O controllers may be required to support as many as 64,000 commands or more, each requiring an associated DEK. Accordingly, memory associated with the host system and responsible for storing wrapped keys may be appropriately sized (or include a partition of suitable size) to accommodate a key capacity of either 64,000×320 bits or 64,000×576 bits or more. When the data resident on the connected device are no longer needed, the keys stored in system memory may be discarded.

A controller may receive an active command or request for access directed to a particular device operably coupled to one or more ports. As indicated at block 304, the controller may receive a key associated with the command or request. It will be appreciated that the command and its associated DEK may be received substantially simultaneously, such that the host provides the associated DEK upon invocation of an active command; i.e., when the controller receives a particular command, the DEK is provided along with the command. As set forth above, keys received by the controller at block 304 may be wrapped when received.

Mere a wrapped DEK is received in connection with a command issued to the controller, it may generally be desirable to ensure that the DEK is unwrapped by the time a data frame arrives at the controller for processing. In that regard, a wrapped DEK may be unwrapped as indicated at block 305. As set forth above, the unwrapping operation at block 305 may include loading a suitable KEK into an unwrap engine from memory via dedicated hardware state machines. An unwrapped DEK may temporarily be maintained or isolated in a suitable write only memory device (block 306). In the FIG. 2 embodiment, cryptocontext memory 199 at controller 190 may be implemented as such a secure memory, i.e., no element of system 100 other than state machines 197 may write to or read from cryptocontext memory 199, and state machines 197 may be prevented from writing unwrapped keys to any component other than cryptocontext memory 199 in some instances. In operation, key unwrap engine 192 may unwrap the DEK and pass it (in unencrypted, plaintext form) to state machines 197 which, in turn, may write the plaintext DEK into cryptocontext memory 199 where it may be employed to initialize encryption engine 195 or decryption engine 193. This is illustrated in FIG. 2 by the dashed arrows between key unwrap engine 192 and cryptocontext memory 199, and between cryptocontext memory 199 and the logic engines in port 191; the writes to and reads from cryptocontext memory 199 represented by the dashed arrows are controlled exclusively by state machines 197. In some embodiments, a different state machine may be implemented for write access and for read access with respect to cryptocontext memory 199.

In the foregoing manner, access to unwrapped DEKs may be prevented or otherwise controlled as indicated at block 307. The operation depicted at block 307 prevents software or firmware modules from reading unwrapped keys maintained in protected memory.

It will be appreciated that the arrangement of the blocks in FIG. 3 does not necessarily imply a particular order or sequence of events, nor is it intended to exclude other possibilities. For example, the operation depicted at 304 may be executed in two discrete procedures as noted above. Additionally, following the wrapping and storage operations at blocks 302 and 303, some embodiments may delete copies of plaintext keys that may remain resident in unprotected system memory, caches, and the like; as an alternative, this deletion may occur prior to, or substantially simultaneously with, storage of the wrapped versions of keys at block 303.

With reference now to both FIGS. 2 and 3, it will be appreciated that, in some implementations, it may not be desirable to accommodate both key wrapping and key unwrapping functionality in a single engine or state machine. Further, since key unwrap engine 192 is generally employed dynamically as commands are issued to controller 190, it has performance requirements that are different from a key wrapping engine that may be employed only once during the life cycle of a particular key. The total number of clock cycles required to unwrap a single 320 bit encrypted key is approximately 264—the number of clock cycles required to unwrap a 576 bit encrypted key is even greater (approximately 528). As noted above, it is desirable to complete this unwrapping process prior to reception (at controller 190) of the first data frame associated with a particular control frame. Accordingly, suitable delay in data frame delivery or sufficient processing capacity at controller 190 (to accommodate the unwrapping process) may be provided such that operation of key unwrap engine 192 does not adversely affect overall performance of the system in which controller 190 is employed.

In some alternative embodiments, a single key may be divided into two distinct half-keys; e.g., a 512 bit AES-XTS key may be divided into two 256 bit half-keys, or a 256 bit AES-XTS or AES-XEX key may be divided into two 128 bit half-keys. These half-keys may be unwrapped individually, which tends to increase the number of clock cycles required for decryption; alternatively, an additional key unwrap engine may be employed such that the half-keys may be decrypted in parallel, decreasing the number of clock cycles required (as compared to decrypting a whole key with a single decryption engine), but at the expense of adding redundant hardware.

As noted above, a KEK is generally stored in plaintext form for use by the controller; in some embodiments, a KEK may be stored in a dedicated memory component (such as memory 201). In the most secure systems, it is desirable that only specific state machines running at the controller itself have access to the memory where KEKs are stored. Integrated (i.e., within the controller) flash memory may be employed to store KEKs securely, but implementing such integrated, or "on-chip," memory may be impractical due to limitations in manufacturing processes, for example. As an alternative, KEKs may be stored in a stacked flash memory (i.e., flash memory mounted on top of the chip). However, this configuration may present heat dissipation challenges or may otherwise be impractical. As another alternative, KEKs may be stored in side-by-side (i.e., not stacked on-chip) flash memory or some other suitable data storage device within the same package as the chip. This is illustrated by the dashed box around memory 201 in FIG. 2.

It will be appreciated that if off-chip flash memory or other suitable data storage is mounted within the same package as the chip, then the package should be embodied in or comprise material or connective mechanisms that are tamper-resistant. Alternatively, the package may be constructed such that it is tamper-proof. Providing security measures such as tamper resistance may prevent an unauthorized individual from opening the package and observing or otherwise intercepting the KEK as it passes between the memory device and the controller.

In some embodiments, a tamper pin may be employed as a primary input pin for an integrated IC embodiment or a stand-alone controller embodiment. The tamper pin may be triggered (such as by a register setting, for example) by an external mechanism to provide an indication of unauthorized attempts to access the system, for example, or responsive to some predetermined event that may be selected or defined by a system administrator. The tamper response may also be triggered by internal processes under certain circumstances. By way of example, a UART lock-out bit may trigger the tamper response under certain circumstances if an external UART access is attempted; similarly, the tamper response may be triggered if an unauthorized attempt is made to access the KEK. By way of another example, a JTAG lock-out bit may trigger the tamper response under certain circumstances if external JTAG access is attempted.

When asserted, the tamper pin may invoke an internal tamper-response function. Responsive to a particular state of the tamper pin bit or bits, for example, any DEKs may be deleted from encryption engine 195 and decryption engine(s) 193, as may all plaintext keys currently stored in the cryptocontext memory 199 in any controller 190, as well as all KEKs currently stored in key unwrap engine 192. As an additional option, assertion of the tamper pin may cause a KEK to be deleted from the memory dedicated to storing it (e.g., non-volatile memory 201), requiring system administrator intervention to re-enable future encryption and decryption capabilities enabled by that KEK.

In that regard, KEK validation procedures may be implemented to ensure that an unauthorized party has not substituted a new KEK for the legitimate KEK. For example, an authorized entity may request that an encryption engine wrap a nonce (i.e., a random number). If the resulting encryption matches a value known to the authorized server (employing the legitimate KEK), then the KEK employed by the encryption engine is still valid. If, on the other hand, the resulting encryption does not match a known value, then the KEK has been compromised. Other techniques of KEK validation are generally known.

Figure 4:
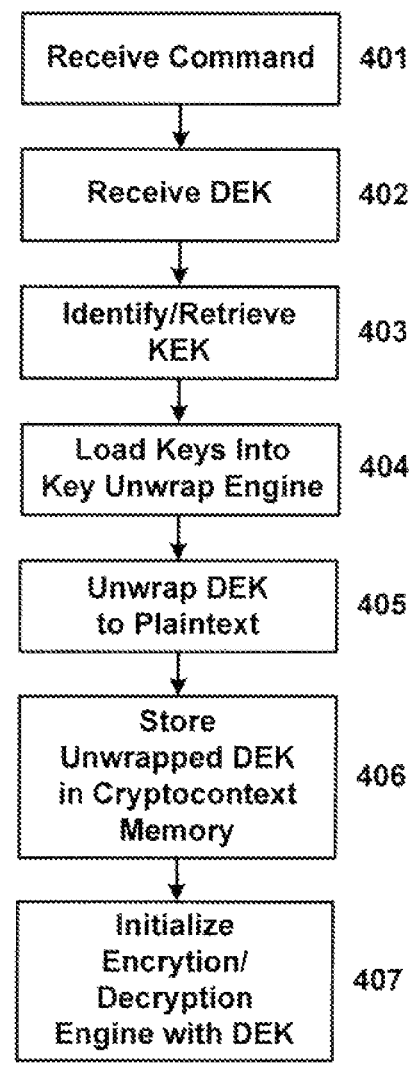
FIG. 4 is a simplified flow diagram illustrating the general operation of one embodiment of a method of implementing and managing keys in hardware.

With reference now to FIGS. 2 and 4, it is noted that FIG. 4 is a simplified flow diagram illustrating the general operation of one embodiment of a method of implementing and managing keys in hardware. Controller 190 may receive an active command to access a device coupled to port 191 (block 401). In that regard, firmware or software instruction sets used to generate such a command generally create a data structure that identifies data to be transmitted, indicates where such data are located (e.g., in memory 111), and specifies a particular DEK (and its address in memory 111) to be used for encryption or decryption purposes. Additionally, the command data structure may also identify a KEK required to unwrap the DEK. Given information in the command, a wrapped DEK associated with the command may be received (block 402) and loaded into key unwrap engine 192 (block 404). The KEK necessary to unwrap the DEK may be retrieved from memory 201 (block 403) and loaded into key unwrap engine 192 (block 404); if the KEK is already stored in a cache or other mechanism at engine 192, retrieval from memory 201 may not be necessary. As set forth above, many KEKs may be stored in unwrap engine; accordingly, the operation depicted at block 403 may precede the operations at block 402 and 401.

The DEK may be unwrapped (block 405) at engine 192 and written (in plaintext form) to cryptocontext memory 199 under control of state machines 197 substantially as set forth above. The unwrapped DEK may be employed by state machines 197 to initialize (block 407) either encryption engine 195 or decryption engine 193 as appropriate, depending upon whether the command requires a write or a read operation. Mere access to cryptocontext memory 199 by all system components other than state machines 197 is suitably controlled, the foregoing strategy enables hardware data encryption and decryption functionality at controller 190 without subjecting the keys to possible interception or unauthorized use.

The hardware implemented system and method of managing keys as set forth above may also have utility in managing KEKs as well. For example, it may be desirable to introduce a new or additional KEK (to support additional functionality) from time to time. In highly secure systems, such a new KEK may be wrapped (e.g., by a source external to system 100) to prevent access by components of system 100 illustrated in FIG. 1. Upon receipt of a command to update memory 201 with the new KEK, controller 190 may load the wrapped KEK to key unwrap engine 192 and use a different KEK to enabling unwrapping. As set forth above, state machines 197 may be employed to write the plaintext version of the new KEK, after unwrapping, to memory 201. Alternatively, state machines 197 may be employed first to write the plaintext version of the new KEK into cryptocontext memory 199, and next to write the new KEK into memory 201.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of managing keys by a controller implemented in a single integrated circuit package, said method comprising:
   controlling, by the controller, data transfer between a host system and a device, wherein the controller is configured as a host bus adaptor and implemented as an integrated circuit;
   connecting the controller to a communication bus to the host system via a first port, and connecting the controller to the device via a second port;
   receiving, by the integrated circuit of the controller, a data encryption key in encrypted form, the data encryption key associated with a command directed to the device connected to the controller;
   employing, by the integrated circuit, a key encryption key to unwrap the data encryption key;
   storing, by the integrated circuit of the controller, the unwrapped data encryption key in a protected memory, wherein the protected memory is connected to the integrated circuit; and
   selectively controlling access to the protected memory, wherein the integrated circuit protects the protected memory from being accessed by the host system.

2. The method of claim 1 wherein said receiving comprises accepting the data encryption key in encrypted form from an unprotected memory.

3. The method of claim 2 wherein said employing a key encryption key comprises utilizing an advanced encryption system mode.

4. The method of claim 3 wherein the advanced encryption system mode is AES Key Wrap.

5. The method of claim 1 wherein said storing comprises utilizing a state machine to write the unwrapped data encryption key to the protected memory.

6. The method of claim 1 wherein said controlling comprises controlling write access and read access to the protected memory with a state machine implemented as part of the integrated circuit in the controller.

7. A non-transitory computer-readable medium encoded with a computer-executable program causing a controller to perform the method of claim 1.

8. A controller comprising:
   an integrated circuit implemented on a package including one or more ports that are configured to connect to a device;
   a key unwrap engine implemented in hardware on the package, wherein the key unwrap engine is configured to unwrap a data encryption key associated with a command directed to the device connected to said controller via the one or more ports;
   a cryptocontext memory implemented in hardware on the package and connected to the key unwrap engine in the integrated circuit,
   wherein the key unwrap engine is configured to store the unwrapped data encryption key in plaintext form in the cryptocontext memory; and
   a state machine implemented in hardware on the package and connected to at least the key unwrap engine and the cryptocontext memory via circuit paths, wherein the state machine is configured to write the data encryption key in plaintext form to said cryptocontext memory,
   wherein the integrated circuit is configured to provide said state machine with exclusive access to the data encryption key in plaintext form in said cryptocontext memory via the circuit paths.

9. The controller of claim 8 further comprising a data encryption engine to encrypt data associated with the command, wherein said state machine initializes said data encryption engine with the unwrapped data encryption key.

10. The controller of claim 8 further comprising a data decryption engine to decrypt data associated with the command, wherein said state machine initializes said data decryption engine with the unwrapped data encryption key.

11. The controller of claim 8 wherein said state machine is prevented from writing the unwrapped data encryption key to memory other than said cryptocontext memory.

12. The controller of claim 8 wherein the controller is implemented on-chip in the package.

13. The controller of claim 8 wherein the package is embodied in a material that is tamper-resistant to prevent an individual from opening the package.

14. The controller of claim 8 further comprising a non-volatile memory implemented in the integrated circuit of the package, wherein the integrated circuit is configured to store in the non-volatile memory a key encryption key for initializing said key unwrap engine.

15. The controller of claim 14 wherein the state machine comprises a plurality of state machines each connected to the non-volatile memory by circuit connections, wherein the state machines are configured to control access to said non-volatile memory.

16. The controller of claim 15 wherein the integrated circuit is configured to provide said state machine with exclusive access to said non-volatile memory.

17. The controller of claim 15 wherein the plurality of state machines include a first state machine to read the key encryption key from said non-volatile memory is prevented from writing the key encryption key to any location other than said key unwrap engine.

18. The controller of claim 15 wherein the plurality of state machines include a second state machine to write the key encryption key to said non-volatile memory is prevented from reading the key encryption key from any location other than said key unwrap engine.

19. The controller of claim 8 wherein the integrated circuit includes a connective mechanism that prevents the cryptocontext memory from being accessed by the host system, or by any component external to the controller.

20. A controller comprising:
a single integrated circuit package configured with an integrated circuit to facilitate data transfer between a host system and a device, the single integrated circuit package including one or more ports for connecting with a communication bus to the host system and one or more ports for connecting to the device;
a cryptocontext memory implemented on the single integrated circuit package;
key unwrapping means for unwrapping a key associated with a command directed to the device connected to said controller, wherein the key unwrapping means is implemented in the integrated circuit and connected to the cryptocontext memory;
a state machine implemented in hardware in the integrated circuit and is connected to the cryptocontext memory and to the key unwrapping means;
wherein the state machine is configured for writing the unwrapped key in plaintext form to the cryptocontext memory; and
wherein the integrated circuit is configured to prevent elements from the host system from accessing the cryptocontext memory by permitting only the state machine to have read and write access to the cryptocontext memory.

21. The controller of claim 20 further comprising a data encryption engine connected to the one or more ports, wherein the data encryption engine is configured to encrypt data associated with the command, wherein said data encryption engine is initialized with the unwrapped key.

22. The controller of claim 20 further comprising a data decryption engine connected to the one or more ports, wherein the data decryption engine is configured to decrypt data associated with the command, wherein said data decryption engine is initialized with the unwrapped key.

23. The controller of claim 20 wherein the state machine includes a circuit configured to prevent writing the unwrapped key to a memory other than the cryptocontext memory.

24. The controller of claim 20 wherein said key unwrapping means is operative in accordance with an advanced encryption system mode.

25. The controller of claim 24 wherein the advanced encryption system mode is AES Key Wrap.

26. The controller of claim 20 wherein the integrated circuit includes a connective mechanism that prevents the cryptocontext memory from being accessed by the host system, or by any component external to the controller.

27. The controller of claim 20 wherein the integrated circuit of the controller is configured as a host bus adaptor to facilitate data transfer between the host system and the device.

28. The controller of claim 20 further comprising a non-volatile memory implemented in the single integrated circuit package, wherein the integrated circuit is configured to store in the non-volatile memory a key encryption key for initializing said key unwrapping means.

29. The controller of claim 28 further comprising a plurality of state machines implemented in the integrated circuit to control access to said non-volatile memory.

30. The controller of claim 29 wherein said state machines have exclusive access to said non-volatile memory.

31. The controller of claim 29 wherein a first state machine to read the key encryption key from said non-volatile memory is prevented from writing the key encryption key to any location other than said key unwrapping means.

32. The controller of claim 29 wherein a second state machine to write the key encryption key to said non-volatile memory is prevented from reading the key encryption key from any location other than said key unwrapping means.

33. The controller of claim 29 wherein a third state machine to write the key encryption key to said non-volatile memory is prevented from reading the key encryption key from any location other than said cryptocontext memory.

* * * * *